United States Patent [19]

Owades

[11] Patent Number: 4,828,848

[45] Date of Patent: May 9, 1989

[54] METHOD OF MAKING SALT-FREE PICKLES

[76] Inventor: Joseph L. Owades, 3097 Wood Valley Rd., Sonoma, Calif. 95476

[21] Appl. No.: 8,547

[22] Filed: Jan. 29, 1987

[51] Int. Cl.$^4$ ............................................. A23B 7/10
[52] U.S. Cl. ....................................... 426/49; 426/615
[58] Field of Search ................... 426/615, 49, 17, 626, 426/267, 615

[56] References Cited

U.S. PATENT DOCUMENTS

| | | | |
|---|---|---|---|
| 2,899,314 | 8/1959 | Rohrkaste | 426/48 |
| 2,960,410 | 11/1960 | Rohrkaste | 426/48 |
| 4,614,655 | 9/1986 | Hashino et al. | 426/49 |

FOREIGN PATENT DOCUMENTS

| | | | |
|---|---|---|---|
| 2127447 | 9/1972 | France | 426/615 |
| 50-21543 | 7/1975 | Japan . | |
| 51-34900 | 9/1976 | Japan | 426/615 |
| 53-2945 | 2/1978 | Japan | 426/267 |
| 53-53385 | 2/1978 | Japan | 426/615 |
| 59-98662 | 6/1984 | Japan | 426/615 |
| 59-106280 | 6/1984 | Japan | 426/615 |
| 60-27335 | 2/1985 | Japan | 426/615 |

OTHER PUBLICATIONS

Frazier 1967, Food Microbiology McGraw-Hill Book Company, New York, pp. 212–217.

*Primary Examiner*—Donald E. Czaja
*Assistant Examiner*—Carolyn Paden
*Attorney, Agent, or Firm*—Richard L. Neeley

[57] ABSTRACT

Methods of preparing pickled foods are provided which comprise processing raw or cooked produce in an aqueous pickling solution of acetic and/or lactic acid and ethanol having an osmolarity equivalent to that normally used in brine pickling processes.

4 Claims, No Drawings

METHOD OF MAKING SALT-FREE PICKLES

BACKGROUND OF THE INVENTION

1. Field of the Invention

The present invention relates to a method of preparing pickled food stuffs. More particularly it relates to a method of preparing food stuffs without the use of sodium chloride or other metallic salts.

DESCRIPTION OF THE BACKGROUND

Many food stuffs have been preserved and made more flavorful by pickling. The pickling process typically begins with a brine (sodium chloride solution) treatment, followed by various steps depending on the type of picking process being utilized. Vinegar is often added as a preservative for foods that are not fermented. Further treatment with brine, with or without vinegar, is generally utilized for fermented foods. The concentration of sodium chloride in the brine utilized at the various steps of the pickling process varies from about 2% to 10% or more.

The sodium chloride content of the pickling solutions provides a selective environment for lactic acid bacteria responsible for desirable changes in the quality of the product. The brine solution provides an osmotic differential which dehydrates and solubilizes nutrients from raw produce to provide the necessary materials for fermentatin microorganisms. Most lactic acid bacteria are salt- and acid-tolerant including *Lactobacillus planterum*, an important organism in the fermentation process that occurs in pickling. Lactic acid bacteria are facultative anaerobes and are known to grow and produce more acid, thereby rendering the pickling environment even more selective for their growth, under conditions of approximately 6% sodium chloride concentration and anaerobic conditions. On the other hand, most undesirable microorganisms in fermentation are aerobic and are salt- and acid-sensitive.

Consumer concern regarding sodium intake has stimulated interest in the field of low-salt and no-salt pickling processes. Normal pickling processes are known to produce sodium levels of about 1400 mg per 100 g of pickle. However, reductions in salt levels are known to have disadvantageous effects. Studies conducted in various salt preserving methods have indicated that reducing sodium chloride levels results in higher aerobic plate counts of undesirable microorganisms. Furthermore, the microbiology of fermentative pickling is complex and highly variable, with relatively unpredictable changes in quality occurring with minor changes in standard pickling processes.

Accordingly, new pickling processes for producing reduced or no-salt pickles while retaining high quality of the food product are highly desirable.

DESCRIPTION OF RELEVANT LITERATURE

Growth of *lactobacillus planterum* in cucumber extract containing various chloride salts is described in Naewbenij et al., *Journal of Food Science* (1956) 51:1257–1260. Numerous pickling recipes exist in the cookbook literature. A number of such pickling techniques are described in Hertzberg et al., *The New Putting Food By*, 3rd Edition, the Steven and Greene Press, Brattleboro, Vermont, 1982. The theoretical relationships between concentrations of small molecules dissovled in water and osmotic pressure are well known and described in numerous physical chemistry texts, such as Daniels and Alberty, *Physical Chemistry*, 3rd Edition, John Wiley and Sons, New York, 1967, pp. 170–172.

SUMMARY OF THE INVENTION

The present invention provides an improved method for preparing pickled foods in which the brine solution used in processing produce that is being converted into a pickle is replaced completely or in part by an osmotically equivalent aqueous pickling solution of an ingestible organic acid and ethanol. The method can be utilized with either fermentative or non-fermentative pickling techniques.

DESCRIPTION OF SPECIFIC EMBODIMENTS

The present invention has arisen out of investigations into alternatives for utilizing brine in the pickling process. It has been discovered that the essential osmotic and preservative effects of sodium chloride in a brine solution can be replaced by an osmotically equivalent mixture of aqueous ethyl alcohol and an ingestible organic acid, such as acetic acid (vinegar). This replacement is particularly useful in pickling processes involving fermentation which previously were carried out utilizing brine solutions. Effective fermentation and preservation has been achieved in solutions in which no metal salts are added to the pickling solution.

Since osmotic pressure depends on the number of dissolved particles in a given volume of solution, the necessary amounts of acetic acid and ethanol can readily be calculated from the molecular weights of these materials. Concentration of solutes in such solutions is often expressed in osmolarity, which expresses the total number of moles of particles per liter of solution rather than the number of formula weights or molecular weights per liter. Accordingly, a 1 molar solution of sodium chloride is 2 osmolar and a 1 molar solution of a non-ionizing substance, such as sucrose, is 1 osmolar.

Fermentative pickling is generally carried out in a solution containing from 2% to 10% sodium chloride. These limits correspond to from about 0.68 to 3.4 moles of dissolved particles per liter. Equivalent concentratins of ethanol and ingestible organic acids can be calculated from the properties and molecular weights of the compounds being utilized. Since ethanol does not dissociate, the number of moles of ethanol present can be calculated from the weight in grams per liter of solution and its molecular weight (46 g/mole). Although acetic acid dissociates to some slight extent (approximately 1.5% in a 0.1 M solution), this small amount of dissociation can usually be ignored for the purposes of this invention. Accordingly, the contribution of acetic acid can be approximated directly from the weight in grams of acetic acid per liter of solution and its molecular weight (60 g/mole). The calculation for lactic acid, another ingestible acid, is somewhat more complicated since lactic acid is stronger than acetic acid and dissociates more, on the order of 9–10% in a 0.1 M solution. This dissociation (which varies in the typical manner for organic acids with variations in concentration) should be taken into consideration when determining the exact osmolarity of the solution from the molecular weight of lactic acid (90 g/mole) and the weight utilized per liter of solution.

General references in this specification to amounts of acid to be added are based on the assumption that the amount of dissociation is small and can be ignored. Especially when utilizing lactic acid, the amount of dissociation should be taken into consideration (which typically will reduce the weight of lactic acid utilized by about 10%).

For practical purposes, the organic ingestible acids utilized in the invention are limited to acetic acid and lactic acid. Other organic acids are undesirable because of either toxicity (e.g., formic acid) or organoleptic properties (e.g., propionic acid) or both.

The invention can be practiced by utilizing any mixture of acetic and/or lactic acid and ethanol as long as the pickling solution has an osmolarity due to these components equivalent to that produced by from about 0.6 to about 3.5 moles of particles per liter. Equivalence here does not require mathematical exactness, but actual amounts to be used are preferably within 20%, more preferably within 10%, of the theoretical equivalent. Within these limits, it is preferred to have the acetic acid concentration in the range of from about 0.5 to about 20% and the ethanol concentration in the range of from about 0.8 to 16%. All percentage concentration set forth in this specification refer to a weight-/volume percentage (i.e., 2%=20 g/l) unless otherwise specified or clear from the context. More preferably, the concentration of acetic acid is maintained in a range of from about 0.8 to 12% and the concentration of ethanol is maintained in the range of from about 2 to about 12%. Lactic acid percentage are adjusted to give an equivalent osmolarity.

When utilizing acetic acid, the acetic acid is usually presented in the form of vinegar solutions prepared by fermentation (optionally processed, such as by distillation, to provide more concentrated solutions) since such solutions are more readily accepted for human consumption.

The non-brine solutions of the invention will permit the growth of bacteria which normally are present in fermentative pickling media. Ethyl alcohol is consumed by the bacteria during this process, so that the concentrations given for a pickling solution are the initial concentrations prior to initiation of the pickling process. During a pickling process, the bacteria produce lactic acid which acts to further preserve the pickles as well as other components that add to the flavor of the pickled product.

The process of the invention can be carried out with any produce including cucumbers, green tomatoes, beans, califlower, cabbage, pumpkins, cantalopes, watermelons, and peppers. As used herein, the pickling process also refers to the preparation of relishes, which are typically prepared in the same manner of substances normally known as pickles but generally comprise mixtures of produce more finely chopped then the produce associated with pickles. The method is particularly useful in the pickling of cucumbers, green tomatoes, and cabbage.

Pickles (and relishes) are typically produced by one of three standard processes. The so-called long-brine process is typically carried out in the prior art by placing whole produce (such as cucumbers) or parts thereof in a heavy salt solution optionally containing vinegar and/or spices. The produce is then left in a cool place to cure for several weeks. Scum accumulating at the top of the brine is removed daily, since this scum contains aroebic bacteria and other undesirable contaminants and waste products. Following this curing process, the pickles are placed loosely in clean jars and covered with either the same solution or freshly made brine followed by processing in a boilingwater bath prior to sealing of the canning jars or other container.

The short-brine process comprises placing produce overnight in a brine solution to crisp. The next day the produce is packed into jars, covered with a pickling solution, and processes in a boiling-water bath for the time recommended for the individual produce type. In some cases hot vinegar solutions are used as the pickling solution.

The third process comprises complete precooking of the produce. This process is typically used for relishes and similar pickle mixtures utilizing a sweet-sour liquid. The produce is packed hot in regular canning containers which are then treated to a short boiling-water bath treatment. Detailed procedures for pickling are set forth in numerous references including those previously mentioned in this specification.

The present invention can be utilized to replace brine solutions in any normal pickle recipe, including all three of the processes described above, thereby allowing the pickling process to take place in the absence or reduced presence of added metal salts, particularly added sodium chloride. The invention can be practiced either by replacing part or all of the metal salts normally used in pickling with a solution or series of solutions as described herein. Accordingly, low sodium content can be provided without the necessity of resorting to different metal salts such as potassium chloride, magnesium chloride, or calcium chloride, which have in some cases been reported to produce off-flavors in various cured products. Low sodium content preferably means less than about 100 mg sodium per 100 g pickle, more preferably less than about 50 mg, most preferably less than about 30 mg.

The invention is particularly useful in fermentation picling in which a solution of the invention is utilized during the fermentation process. When used in non-fermentation pikling processes, the invention is preferably carried out by utilizing a solution of the invention to replace the brine soltuion that is typically used initially to firm up the produce being pickled.

It will be recognized by those skilled in the art that the word "replacing" when used in this specification does not indicate that a brine solution is prepared and then physically replaced with a solution of the invention. Rather, "replacing" is utilized to indicate that a solution of the invention is utilized in place of a brine solution during the pickling process.

A number of exemplary recipes are provided for guidance in the utilization of the present invention.

MUSTARD PICKLES (12 pints)

1 bunch of celery
2 rounded quarts green tomatoes
4 sweet red bell peppers
1 quart tiny white onions, not larger than 3/4 in. diameter
3 cauliflowers, about 6–7 in. in diameter
4 large green cucumbers
1 quart 100 proof (i.e., 50%) alcohol
3 quarts vinegar
(the alcohol and vinegar replace 1 cup pickling salt and 4 quarts water)

Refrigerate each prepared vegetable as it is completed until all are ready for the pickling mixture.

Wash, trim, and cut each celery rib in ½-in. length.

Slice stem and blossom ends from green tomatoes and cut into small bite-sized pieces.

Wash peppers, remove stems and seeds, and cut into ¾-in. chunks.

Peel and wash onions.

Peel cucumbers, cut into quarters, remove seeds with a spoon, and cut into 3/4-in. squares.

Wash cauliflowers, remove heavy center stems, break into small flowerettes, and heat to boiling for 3 min. in a small amount of water; drain and cover immediately with very cold water to stop the cooking process.

Place all prepared vegetables into a large enameled or stainless-steel kettle and add a mixture of the aqueous acetic acid/ethanol mixture.

Let stand over night.

Bring to a boil the next day and then drain quickly.

A mustard sauce is then prepared according to the following recipe.

1 cup flour
6 tablespoons dry mustard
7 cups sugar
1½ tablespoons tumeric dissolved in a small amount of cold vinegar
1 quare of boiling-hot vinegar Combine in the order given and mix well over the stillhot vegetables, dividing the sauce if two kettles are used.

Over medium heat, bring to a boil, and boil gently for 5 minutes, stirring well to prevent the flour from lumping.

Ladle into hot pint jars, leaving ½ in. of head room. Adjust lids and process in a boiling-water bath (212° F./100° C.) for 15 minutes.

Remove and complete seals if necessary.
Makes 12 pints.

Cucumber Pickles (12 pints)

6 quarts of thinly sliced pickling cucumbers (about 15 6-in. cucumbers)
6 medium onions, thinly sliced
9 fluid oz. 100 proof alcohol
1½ quarts white vinegar
4½ cups sugar
½ whole mustard seed
1 tablespoon celery seed
(alcohol replaces ½ cup salt)

Wash cucumbers, remove stem and blossom ends, and slice thin.

Peel onions, slicing thinly.

Place sliced vegetables in an enameled, crockery, or stainless-steel bowl.

Meanwhile combine vinegar, sugar, alcohol, mustard, and celery seed in a large stainless-steel enameled kettle and bring to a boil.

When boiling, add the cucumber and onion slices; over medium heat bring to a low boil and pack immediately into clean, hot 1-pint jars, leaving ½ in. of head room.

Process in a boiling-water bath for 10 min. Complete seals if necessary. Makes 12 pints.

The recipes set forth above are designed for home use and presume a concentration of 5% acetic acid in vinegar. The processes can readily be adapted to commercial pickling processes by proportionally increasing the amounts of components utilized. Adjustments can be made as necessary to adopt the process of the invention to the requirements for bulk handling of produce in commercial situations while remaining within the spirit and scope of replacing salt with an osmotically equivalent solution of alcohol and an ingestible organic acid, as described herein.

It is recognized that many food processing techniques have been developed that do not call for the use of salt and/or fermentation but instead rely on othe techniques for preserving food. For example, many canning processes have been developed that utilize heat (typically boiling water or steam under pressure) to preserve foods. Such techniques are not equivalent to the pickling process of the present invention, since the present invention does not require alternative preserving techniques. The present invention therefore is preferably utilized with techniques that do not involve temperatures greater than 100° C., more preferably not greater than 75° C., at any point during the preserving process. Likewise, the process preferably relies solely on acetic and/or lactic acid and ethanol as preserving agents. Naturally, spices and other components that might be considered preserving agents if present in high enough concentration can be present to enhance flavor and/or appearance.

The invention now being generally described, the same will be better understood by reference to the following detailed examples which are setforth for purposes of illustration only and are not to be considered limiting of the invention unless so specified.

EXAMPLE 1

Pickling Solution 12 fl. oz. vinegar
7 fl. oz. 100 proof alcohol
16 oz. water
½ oz. fresh dill
2 cloves garlic
1 tsp. mustard seed
1 tsp. allspice
3 bay leaves
1 tsp. black pepper
1 tsp. red pepper All ingredients were combined to give a pickling solution. Two pounds of washed black spine cucumbers were immersed in the solution and allowed to remain totally immersed for about two weeks. After two weeks fermentation, the cucumbers were pickled. The tast was indistinguishable from that of commercial brined pickles.

EXAMPLE 2

Pickling solution 100 fl. oz. vinegar
42 fl. oz 80 proof alcohol
12 qts. water
1 lb. garlic
6 oz. dill
3 oz. black pepper
2 oz. cayenne pepper
1 oz. bay leaves
3 oz. mustard seed
1 oz. mace All ingredients were combined to give a pickling solution. Fifty pounds of cleaned pickling cucumbers were totally immersed in this solution. The cucumbers were suitable for consumption or storage after 10-days fermentation.

EXAMPLE 3

Pickling Solution 20 fl. oz. vinegar
2.5 fl. oz. 100 proof alcohol
1 fl. oz. lactic acid, 88%
10 oz. water
2 tbsp. chopped celery
2 cloves garlic
1 tsp. black pepper
1 tsp. red pepper
½ tsp. allspice All ingredients were combined to give a pickling solution. Two pounds of clean, perfect green tomatoes were immersed for 15 days, at which time the tomatoes were suitable for consumption or storage.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method of preparing pickled foods by a fermentation process, wherein the fermentation process consists essentially of:

fermenting produce selected from the group consisting of cucumbers, cabbage, and green peppers in an aqueous pickling solution containing (1) an ingestible organic acid selected from the group consisting of lactic acid, acetic acid, and mixtures thereof and (2) ethanol, wherein said solution has an osmolarity of from about 0.6 to about 3.5 resulting from said acid and said ethanol, wherein said solution optionally contains a flavoring agent other than sodium chloride, and wherein said solution is substantially devoid of sodium chlodire other than sodium chloride present in said produce.

2. The method of claim 1, wherein said pickling solution is substantially devoid of sodium salts other than sodium salts present ins aid produce.

3. The method of claim 1, wherein said pickling solution contains at least about 2% ethanol.

4. The method of claim 1, wherein said pickling solution comprises from about 0.8 to about 12% acetic acid and from about 2 to about 12% ethanol.

* * * * *